р
2,911,402

Δ²²⁽²⁸⁾-SOLANIDENE-3β,12β-DIOL, Δ⁵,²²⁽²⁸⁾-SOLANIDIENE-3β,12β-DIOL, AND PROCESS FOR THE PREPARATION THEREOF

Masato Tanabe, Los Angeles, and James W. Bolger, Sherman Oaks, Calif., assignors to Riker Laboratories, Inc., Los Angeles, Calif., a corporation of Delaware No Drawing. Application December 11, 1956
Serial No. 627,558

5 Claims. (Cl. 260—239.5)

The present invention relates to novel cyclopentanophenanthrene derivatives and to a process for their production. More particularly, the present invention relates to the preparation of novel derivatives of alkaloids of steroidal structure such as isorubijervine and rubijervine, and derivatives of alkaloids from kurchi bark or solanum alkaloids.

The novel alkaloidal derivatives of this invention are valuable as intermediates for the preparation of steroidal compounds useful in medicine. Thus isorubijervine, which is characterized by the presence of a hydroxyl function at $C_{18}$ in the steroid nucleus, may, after being converted to our novel intermediate dehydroisorubijervine, be oxidized with an oxidizing agent, such as chromic acid, to a steroid compound containing an oxygenated $C_{18}$ carbon atom. The important mineralocorticoid aldosterone, recently isolated, contains the unusual oxygenated $C_{18}$ carbon atom.

If there is used as a starting material the alkaloid rubijervine, there may be obtained novel intermediates which may be converted to steroids of the 12-oxygenated type, which have hitherto been obtained from certain sapogenins or bile acids. For example, rubijervine (Δ⁵-solanidiene-3β-12β-diol) may first be converted to our novel compound dehydrorubijervine perchlorate (3β-12β-dihydroxy-Δ⁵-Δ²²⁻²⁸-solanidiene perchlorate) by the process of the present invention in order to purify it. This compound may be converted to its free base which may then be dissolved in dilute acetic acid (5–10%). This solution by treatment with a suitable oxidizing agent, such as mercuric acetate or chromic acid will produce Δ¹⁶⁻¹⁷-pregnene-3,12,20-trione, which is useful in medicine by reason of its progestational activity. When mercuric acetate is used as the oxidizing agent a further intermediate, the 20-acetoxy derivative of dehydrorubijervine is formed, which may be isolated as the 20-hydroxy derivative on basification.

Also, by treating the novel compound in accordance with this invention, dihydrodehydrosolanidine (Δ²²⁻²⁸-solanidene-3β-ol), with a suitable oxidizing agent, such as chromic acid, the progesterone derivative, Δ¹⁶-pregnene-3,20-dione, which possesses progestational activity, may be obtained.

It has been discovered that, in general, the compounds of the present invention, which are characterized by a nitrogen-containing ring system having a double bond between the nitrogen atom and an adjacent carbon atom and in which the preferred embodiment may be further characterized as having a Δ²²⁻²⁸-solanidene structure in which the 22–28 unsaturation involves the ring nitrogen, by virtue of this labile nitrogen containing unsaturated ring system may be oxidized to cleave and destroy the nitrogen containing rings and thus provide therapeutically-active steroidal compounds.

It is an object of the present invention to provide valuable derivatives of steroidal compounds having a labile nitrogen containing ring system having a double bond between the nitrogen and an adjacent carbon atom.

It is also an object of the present invention to provide cyclopentanophenanthrene derivatives having a labile nitrogen containing ring system having a double bond between the nitrogen and an adjacent carbon atom.

It is a further object of the present invention to provide a novel process for producing derivatives of steroidal compounds.

Other objects of the invention will be apparent to those skilled in the art from reading this specification.

By means of the process of the present invention we have been able to convert steroidal alkaloids of the type represented by the following structural formula:

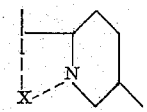

to novel compounds of the type:

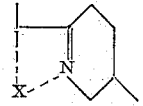

where X represents a cyclopentanophenanthrene group, and preferably a 3,18- or 3,12-di-hydroxycyclopentanophenanthrene group. As shown in the second structural formula the compounds of the invention possess the characteristic unsaturation between the nitrogen atom of the ring structure and an adjacent carbon atom.

In accordance with the process of the invention, the starting material is treated with an oxidizing agent selected from the class consisting of the water-soluble mercuric, silver and cupric salts. These water-soluble salts should be soluble in water to the extent of at least 5% weight/volume at 20° C. if the reaction of the process is to proceed at a reasonably rapid rate. Among the salts which may be employed are the water-soluble mercuric, silver and cupric salts of organic or inorganic acids, such as their nitrates, acetates and benzoates, etc. Mercuric acetate is preferred.

The process of the invention is desirably carried out in the presence of a weak acid solvent in which the oxidizing agent is soluble. The preferred acid solvents are those having a $pK_a$ between about 4 and 8, preferably the lower fatty acids, such as acetic and propionic acids, and their aqueous solutions. Acetic acid is preferred.

Desirably the process is carried out at a temperature of about 50° to 150° C., preferably 50° to 90° C.; for the reaction proceeds most satisfactorily at these temperature ranges.

Among the novel compounds in accordance with this invention is dihydrodehydroisorubijervine (Δ²²⁻²⁸-solanidene-3β-18-diol) of the structural formula (wherein X is an anion, such as the perchlorate anion):

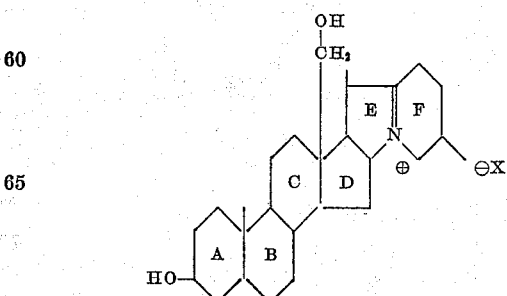

produced from dihydroisorubijervine. As shown in this formula, the dihydrodehydroisorubijervine is designated in ionic form. The free base occurs as a crystalline solid mixture of isomeric forms, which all give the same cation designated above. These compounds are preferably isolated as acid salts of the base as shown in the above formula demonstrating the ionic charges of the base and the acid anion.

Other compounds according to the invention are: dehydroisorubijervine ($\Delta^5,\Delta^{22-28}$-solanidiene - $3\beta,18$ - diol) produced from isorubijervine, dehydroisorubijervone ($\Delta^4$, $\Delta^{22-28}$-solanidiene-3-one-18-ol) produced from isorubijervone, dihydrodehydroisorubijervone-18-carboxylic acid ($\Delta^{22-28}$-solanidene-3-one-18-carboxylic acid) produced from dihydroisorubijervone-18-carboxylic acid, dehydrorubijervine ($\Delta^5,\Delta^{22-28}$-solanidiene-3$\beta$-12$\beta$-diol) from rubijervine, dihydrodehydrorubijervine ($\Delta^{22-28}$-solanidene-3$\beta$-12$\beta$-diol) from dihydrorubijervine, dihydrodehydrorubijervone ($\Delta^{22-28}$-solanidene-3-one-12$\beta$-ol) from dihydrorubijervone, dehydrorubijervone ($\Delta^5,\Delta^{22-28}$-solanidiene-3-one - 12$\beta$ - ol) from rubijervone, dehydrosolanidine ($\Delta^5,\Delta^{22-28}$-solanidiene-3-one-12$\beta$-ol) from rubijervone, dehydrosolanidine ($\Delta^5,\Delta^{22-28}$-solanidiene-3$\beta$-ol) from solanidine, dihydrodehydrosolanidine ($\Delta^{22-28}$-solanidene-3$\beta$-ol) from dihydrosolanidine, dehydro-7-bromoisorubijervine ($\Delta^5,\Delta^{22-28}$-solanidiene-7-bromo-3$\beta$-18-diol) from 7 - bromo - isorubijervine, dehydro - $\Delta^7$ - isorubijervine ($\Delta^5,\Delta^7,\Delta^{22-28}$-solanitriene-3$\beta$-18-diol) from $\Delta^7$-isorubijervine, dehydro-7-keto-rubijervine ($\Delta^5,\Delta^{22-28}$-solanidiene-3$\beta$-18-diol-7-one) from 7-keto-rubijervine; etc. Additionally, mono- and di-esters of these compounds may be prepared, such as those of the organic acids, acetic, propionic, hexoic, benzoic, naphthoic acids, etc. as well as other aliphatic and aromatic carboxylic acids. Thus $\Delta^{22-28}$-solanidene-3$\beta$-18 diol diacetate may be produced from dihydroisorubijervine diacetate.

The novel chemical compounds of the invention possess a distinct characteristic infra-red absorption band at 5.90 to 5.95 microns, which is attributable to the linkage

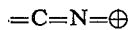

$$=C=N=\oplus$$

The steroidal alkaloid employed as a starting material may be modified by substitution or other modification on rings A, B, C or D prior to carrying out the process of this invention. Thus, for example isorubijervine:

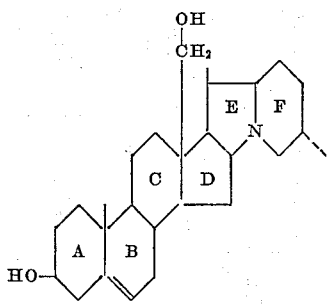

may first be hydrogenated to dihydroisorubijervine:

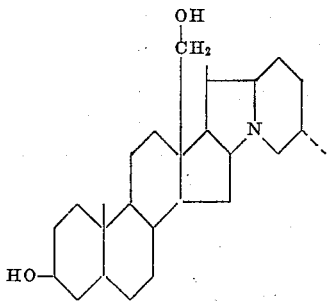

which may then be treated in accordance with the process of the present invention with mercuric acetate and acetic acid to produce the novel compound dihydrodehydroisorubijervine diacetate, obtained as the acetate salt:

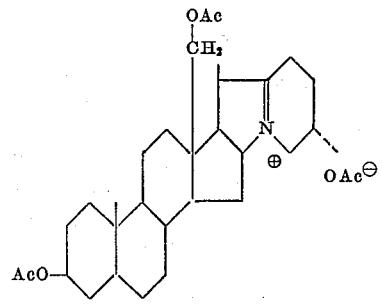

The compounds of the present invention are more readily isolated and used and are more stable in the form of a salt of a mineral acid such as the sulphate, nitrate, hydrochloride, hydrobromide, phosphate or perchlorate. We prefer to produce the perchlorate.

In order more clearly to disclose the nature of the present invention, specific examples illustrating the preparation of typical compounds will hereinafter be described. It should be understood, however, that this is done solely by way of example and is intended neither to delineate the scope of the invention nor limit the ambit of the appended claims.

EXAMPLE 1

*Dehydroisorubijervine ($\Delta^5,\Delta^{22-28}$-solanidiene-3$\beta$, 18-diol perchlorate)*

About 16.5 gm. of isorubijervine were dissolved in 250 ml. of a 50% aqueous solution of acetic acid. The resulting solution was treated with 38.3 gm. of mercuric acetate and heated on the steam bath for 1½ hours. The mercurous acetate which resulted and precipitated was filtered off and the filtrate was treated with gaseous hydrogen sulfide. The solution was centrifuged and the clear supernatant liquid was separated and first treated with 150 ml. of concentrated (28%) ammonium hydroxide. The supernatant liquid was then further basified to a pH of 12 with 12 N sodium hydroxide. The resulting solution was then extracted with a total of 500 cc. of chloroform. The chloroform extract was washed with water, dried over magnesium sulfate, filtered, and 5 ml. of 70% perchloric acid in 5 ml. of methanol were added. Upon cooling, the dehydroisorubijervine perchlorate crystallized. The yield was 11 gm. having a melting point of 259–261° C. The product showed the distinctive infra-red absorption band at 5.90 to 5.95 microns.

EXAMPLE 2

*Dihydrodehydroisorubijervine perchlorate ($\Delta^{22-28}$-solanidene-3$\beta$,18-diol perchlorate)*

About 50 gm. of dihydroisorubijervine was dissolved in 500 ml. of 50% aqueous acetic acid. The resulting solution was treated with 150 gm. of mercuric acetate and heated on the steam bath for 1 hour. The mercurous acetate was filtered off and the filtrates saturated with gaseous hydrogen sulfide. Mercuric sulfide which precipitated was centrifuged off; the solution was basified with 300 ml. of concentrated (28%) ammonium hydroxide and sufficient concentrated (12 N) sodium hydroxide to adjust the pH to about 12. The resulting solution was extracted with 800 ml. of chloroform, washed with water, and the chloroform extract dried over magnesium sulfate. The chloroform extract was acidified with the equivalent quantity of methanolic perchloric acid. 25 gm. of white crystalline dihydrodehydroisorubijervine perchlorate were precipitated on cooling which had a melting point of 274–275° C. The product showed the distinctive infra-red absorption band at 5.90 to 5.95 microns.

EXAMPLE 3

*Dehydroisorubijervone perchlorate ($\Delta^4,\Delta^{22\text{-}28}$-solanidiene-3-one-18-ol perchlorate)*

About 2.0 gm. of isorubijervone were dissolved in 25 ml. of 50% acetic acid. 4.33 gm. of mercuric acetate was added. The solution was heated on a steam bath for 1¼ hours. It was filtered, and the filtrate treated with gaseous hydrogen sulfide. The gasified filtrate was centrifuged and the supernatant liquid was basified with concentrated (12 N) sodium hydroxide to a pH of 12, extracted with 100 ml. of chloroform. The chloroform extracts were washed with water, and dried over magnesium sulfate. The dried chloroform solution was treated with an excess of methanolic perchloric acid. About 350 mg. of dehydroisorubijervone perchlorate were precipitated having a melting point of 277–279° C. The product showed the distinctive infra-red absorption band at 5.90 to 5.95 microns.

EXAMPLE 4

*Dihydrodehydroisorubijervine diacetate perchlorate ($\Delta^{22\text{-}28}$-solanidene-3β,18-diol diacetate perchlorate)*

About 8.3 gm. of dihydroisorubijervine diacetate was dissolved in 50 ml. of 50% aqueous acetic acid. To this was added 22 gm. of mercuric acetate. Almost immediately mercurous acetate precipitated out and the solution turned yellow. It was heated for one hour on the steam bath, cooled, filtered, diluted with 100 ml. of water, and saturated with gaseous hydrogen sulfide. The mixture was centrifuged and the supernatant liquid was treated with 30 ml. of cold (28%) ammonium hydroxide and sufficient 12 N potassium hydroxide to adjust the pH to about 12. The solution was extracted with 150 ml. of chloroform, dried over magnesium sulfate, and the chloroform evaporated in vacuo. The solid residue was dissolved in diethyl ether. The solution was treated with an excess of perchloric acid. 3.5 gm. of dihydrodehydroisorubijervine diacetate perchlorate were obtained having a melting point of 234° C. The product showed the distinctive infra-red absorption band at 5.90 to 5.95 microns.

As will be appreciated by those skilled in the art, other starting materials and reagents in accordance with the present invention may be employed in the foregoing examples. Thus, acetic acid may be replaced by propionic acid, n-butyric acid, etc. Instead of mercuric acetate, one may employ silver acetate, cupric acetate, silver, mercuric or cupric nitrates, mercuric, silver or cupric benzoates, etc. Also other steroidal starting materials may be employed, such as dihydroisorubijervone-18-carboxylic acid, dihydrorubijervine, dihydrorubijervone, solanidine, dihydrosolanidine, etc.

In the structural formulae, in this specification and in the claims, lines extending from the rings without hydrogen atoms attached thereto are employed in accordance with the customary practice to indicate methyl groups.

The terms and expressions which we have employed are used as terms of description and not of limitation, and we have no intention, in the use of such terms and expressions, of excluding any equivalents of the features shown and described or portions thereof, but recognize that various modifications are possible within the scope of the invention disclosed.

What is claimed is:

1. A compound selected from the group consisting of $\Delta^5,\Delta^{22\text{-}28}$-solanidiene-3β-12β-diol and $\Delta^{22\text{-}28}$-solanidene-3β-12β-diol.

2. The process for producing a compound selected from the group consisting of $\Delta^5,\Delta^{22\text{-}28}$-solanidiene-3β-12β-diol and $\Delta^{22\text{-}28}$-solanidene-3β-12β-diol, which comprises treating a compound selected from the group consisting of rubijervine and dihydrorubijervine, respectively, with an oxidizing agent in the presence of a weak acid.

3. A process as defined by claim 2, wherein the oxidizing agent is an oxidizing metallic salt.

4. A process as defined by claim 3, wherein the metallic salt is selected from the group consisting of water-soluble mercuric, silver and cupric salts.

5. A process as defined by claim 2, wherein the acid has a $pK_a$ of between about 4 and 8.

References Cited in the file of this patent

UNITED STATES PATENTS

| | | |
|---|---|---|
| 2,750,380 | Dodson et al. | June 12, 1956 |
| 2,786,843 | Huebner | Mar. 26, 1957 |